Figure 1:
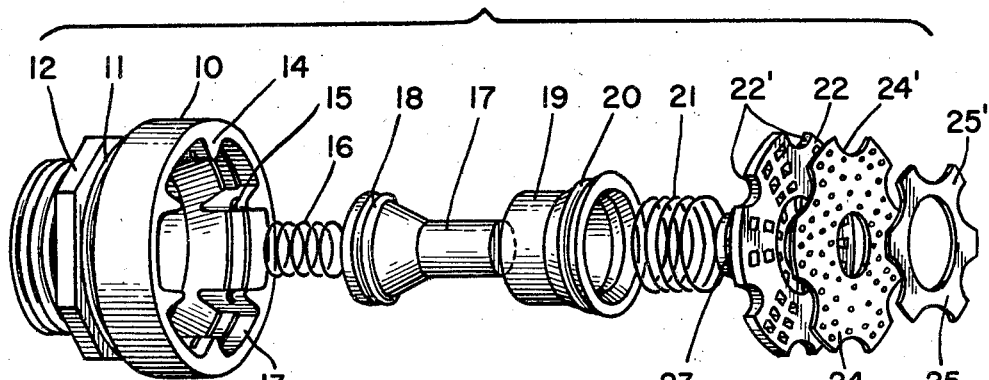

April 7, 1964 S. NOVAK 3,127,907

TWO-WAY POPPET VALVE

Filed Sept. 18, 1962

INVENTOR.
STANLEY NOVAK
BY
Elliott & Pastoriza
ATTORNEYS

United States Patent Office 3,127,907
Patented Apr. 7, 1964

3,127,907
TWO-WAY POPPET VALVE
Stanley Novak, P.O. Box 125, El Segundo, Calif.
Filed Sept. 18, 1962, Ser. No. 224,311
3 Claims. (Cl. 137—493.6)

This invention relates generally to pressure relief valves and more particularly to an improved miniature type poppet valve for use with thin-walled enclosures.

In certain enclosures such as electronic instrument casings and the like, it is desirable that the casing be substantially hermetically sealed to insure protection of the enclosed electrical components. The primary objective of sealing the casings is to keep out dust and dirt and other foreign matter which may adversely affect the operation of the instrument. In many instances, however, environmental pressure changes such as result from altitude changes in air-borne instruments can cause considerable damage to an hermetically sealed casing. For example, if the ambient pressure is considerably reduced, the entire casing can explode. On the other hand, if the ambient pressure is increased an implosion may occur.

While the foregoing difficulties can be overcome by simply designing a casing of sufficient structural rigidity to withstand such pressures, this solution increases the weight and bulk of the entire instrument and is therefore not particularly satisfactory, especially in air-borne applications.

In my United States Patent No. 2,995,148, there is disclosed a two-way poppet valve which, to a large extent, overcomes the foregoing problems. In this patent a two-way poppet valve is disclosed which is adapted to be mounted in an enclosure wall to equalize pressures on each side by passing air in both directions. However, to provide a sufficient air passage when the valve is open has required a relatively large valve.

It is a primary object of this invention, accordingly, to provide an improvement over the type of poppet valve disclosed in my above mentioned United States patent.

More particularly, it is an object to provide an improved poppet valve wherein a larger air passage is provided for both passing air from the interior of the casing to the exterior and from the exterior of the casing to the interior.

Another important object is to provide a poppet valve which functions in both directions and yet in which its over-all axial length may be decreased for the same capacity as compared to two-way poppet valves heretofore available to the end that superior miniaturization may be achieved.

Still another object is to provide an improved two-way poppet valve which will keep out any dirt when in closed position so that all of the advantages of hermetic sealing are still retained with respect to any particular enclosure.

Another object is to provide an improved poppet valve which may be quickly assembled and disassembled from one end.

Briefly, these and many other objects and advantages of this invention are attained by providing a valve body having a hollow interior incorporating first and second movable plungers. A first spring is disposed between the first plunger and a portion of the valve body to urge one end of the first plunger into sealing relationship with one end of the second plunger. A second spring in turn urges the other end of the second plunger into sealing relationship with a surface on the valve body. The second plunger is arranged to surround the first plunger and the springs themselves are in coaxial relationship over a large portion of their lengths so that miniaturization of the valve body can be achieved.

In accordance with an important feature of the invention, the sealing surfaces are of conical configuration to provide a smooth air flow path and a relatively large annular open area for effecting a rapid equalization of pressures when the plungers are moved.

Another feature of the invention resides in a novel assembly means for retaining the various parts within the valve body which is easily removed to permit cleaning or changing of parts.

Figure 2:
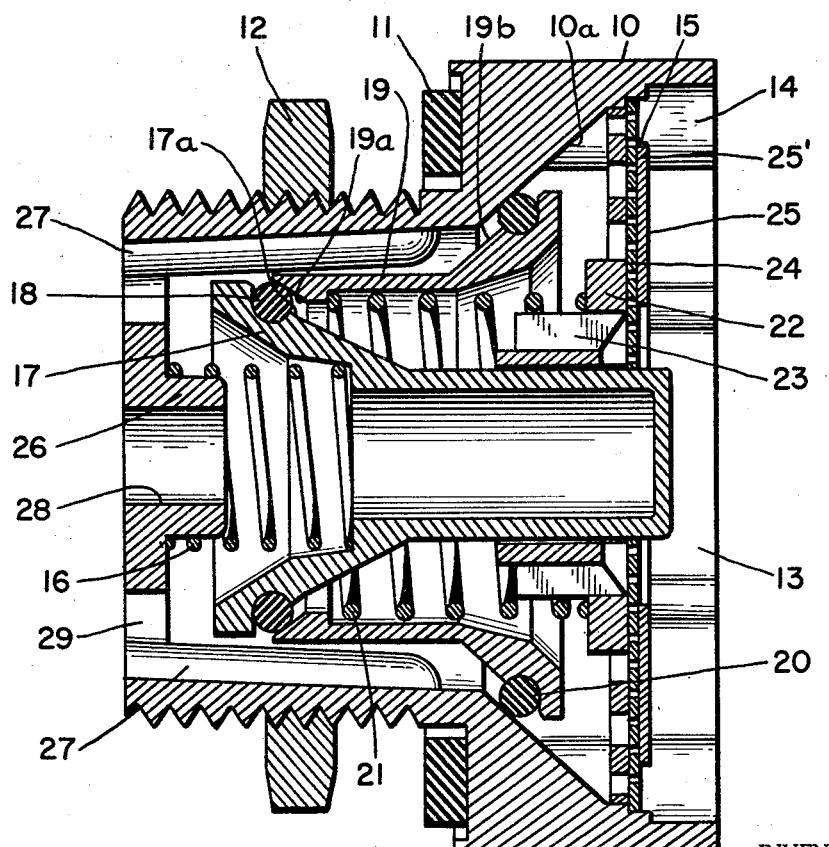

A better understanding of this invention will be had by now referring to a preferred embodiment thereof as illustrated in the accompanying drawings, in which:

FIGURE 1 is an exploded perspective view illustrating the various components making up the improved two-way poppet valve of this invention; and FIGURE 2 is a greatly enlarged cross-section of the assembled two-way poppet valve illustrating the various plungers in closed or sealed relationship.

Referring first to the exploded view of FIGURE 1, the basic components of the valve comprise a valve body 10 provided with a sealing gasket 11 and nut 12 for securing the valve body 10 within a suitable opening in an enclosure or wall. As shown, the interior of the valve body 10 is hollow and generally of cylindrical shape and includes an open front end 13 and an open rear end as will become clear when FIGURE 2 is described. The front end opening 13 includes a plurality of ribs 14 extending longitudinally from the front towards the rear and each including a transverse slot 15.

Receivable within the valve body 10 is a first coil spring 16 for biasing a first plunger member 17 provided with an annular sealing ring 18. A second plunger 19 in turn is received within the casing in coaxial relationship with the first plunger 17. The plunger 19 also includes an exterior annular sealing ring 20. A second coil spring 21 is provided for biasing the second plunger 19.

After the foregoing elements have been assembled within the valve body 10, a perforated retaining disc 22 is positioned within the front end opening 13. As shown, the outer periphery of the disc 22 includes notches or intended portions 22 for straddling the various ribs 14. The perforated disc 22 also includes a rearwardly directed hub portion 23 serving to support one end of the coil spring 21. A metal screen member 24 with indentations 24' may be secured over the disc 22 and the screen perforated disc, and the other elements locked within the valve body 10 by a star washer 25. As shown, washer 25 includes radially directed projections 25' adapted to be received within the transverse slots 15 in the ribs 14 by rotating the washer a few degrees after the same has been inserted with the projections 25' falling between the ribs.

Referring now to FIGURE 2, the various components as described above are shown in assembled condition. With particular reference to the left hand end of the valve body 10, it will be noted that the rear end opening is provided with a spider structure defining a central hub 26 for receiving one end of the first coil spring 16. The other end of the coil spring 16 is received within the first plunger 17 which is generally of a cup shape. The rear end of the first plunger 17 is provided with a conical exterior surface 17a decreasing in diameter in a direction towards the front end of the valve body as shown. This surface 17a supports the first annular sealing ring 18.

The rear end of the second plunger 19 in turn includes an interior conical surface 19a which decreases in diameter in a direction towards the front end of the second plunger as shown. The arrangement is such that this interior conical surface 19a is in opposing releationship to the sealing ring 18 so as to provide an annular seal when in engagement therewith.

The front end of the second plunger 19 flares radially outwardly to define a second conical exterior 19b supporting the second sealing ring 20. This second sealing ring in turn is in opposing relationship to a conical seating area 10a defined within the valve body 10 by a decreasing diameter interior portion as shown.

It will be noted that the rear end of the second coil spring 21 is supported interiorly adjacent to rear end of the second plunger just forward of the interior conical surface 19a. The front end of the second coil spring 21 surrounds the supporting hub 23 of perforated disc 22 as described. The hub portion 23 includes an internal bore 23' cooperating with the front exterior portion 17' of the first plunger 17 to provide a guide for movement of the plunger in an axial direction. Guiding of the movement of the second plunger 19 in an axial direction in turn is effected by a plurality of ribs 27 internally provided in the reduced diameter rear portion of the valve body 10.

The spider structure at the rear end of the valve body 10 includes a central opening 28 in the hub 26 as well as radially spaced openings 29.

The operation of the two-way poppet valve will be evident by reference to the assembled view of FIGURE 2. Assume that a thin wall or other enclosure is sandwiched between the nut 12 and gasket 11 so that the left or rear end of the valve body 10 is exposed to one pressure and the right or front end of the valve body 10 is exposed to a different pressure. If the pressure on the left increases beyond the pressure on the right by a given amount, air will enter through the central opening 28 and other openings 29 to bear against the first plunger 17 and second plunger 19. Ordinarily this air would be sealed from passing out the front end of the valve body 10 by the sealing ring 20. However, when the pressure exceeds the given amount, it will urge both the first plunger 17 and the second plunger 19 as a unit to the right against the bias of the second coil spring 21. In this respect, the bias of the first coil spring 16 will aid the movement somewhat. When this movement takes place, air will pass over the flared exterior surface 19b of the second plunger and through the various perforations in the perforated disc 22, the holes in the metal screen 24 and thence out the front opening of the valve body 10.

If now the pressure should decrease to the left and increase on the right hand side or front portion, air will pass through the front end 13 and perforated screen and disc to urge the first plunger 17 to the left as seen in FIGURE 2. The same pressure will act against the second plunger 19, but the second plunger will remain stationary because of its sealing engagement with the conical seating area 10a of the valve body 10. The first plunger 17, however, is free to move to the left against the bias of the first coil spring 16 until there is provided an annular opening between the conical exterior 17a at the rear end of the first plunger and the interior conical surface 19a at the rear end of the second plunger 19. After the pressure difference has been returned to a value below said given amount, the spring 16 will return the first plunger to its closed position as shown in FIGURE 2.

As a consequence of the particular conical construction of the sealing surfaces, the air flow from one side to the other follows a relatively smooth path. Further, the resulting wedging as a consequence of the conical or sloping surfaces insures an absolutely dust and airtight seal when the pressures are substantially the same on each side of the enclosure. The coaxial relationship of the various plunger and coil springs enables the over-all axial length of the two-way poppet valve to be reduced considerably without reducing the available open area for passing air or other gas from one side to the other when the plungers are operated.

A feature of particular importance insofar as the practicability of the device is concerned, resides in the star washer 25 described in FIGURE 1. As shown in FIGURE 2, the projections 25' seat within the transverse grooves 15 in the ribs 14. There is thus provided excellent support for the perforated disc 22 at several points circumferentially spaced about the interior of the front opening 13. On the other hand, only a single rotative movement is required to simultaneously remove all of the projections 25' from the various transverse slots so that disassembly of the device is easily effected.

While only one particular embodiment of the invention has been set forth and described, various modifications and changes that fall clearly within the scope and spirit of the invention will occur to those skilled in the art. The improved two-way poppet valve is therefore not to be thought of as limited to the particular embodiment set forth merely for illustrative purposes.

What is claimed is:

1. A two-way poppet valve comprising, in combination: a valve body having a cylindrical interior with an open front end and an open rear end, said interior tapering from its front end to a reduced diameter portion to define a front conical seating area; a spider structure at said rear end including an inwardly directed hub; a first coil spring having a rear end supported about said hub to bear against said spider; a first plunger member of cup shape receiving the front end of said spring in its cup opening, said plunger having a conical exterior decreasing in diameter in a direction towards said front end of said valve body; a first sealing ring on said conical exterior; a second plunger having a cylindrical interior with open front and rear ends coaxially surrounding said first plunger, the interior rear end opening on said second plunger having an interior conical surface sloping towards a decreased interior diameter to provide a seating surface in opposing relationship to said first sealing ring on said conical exterior of said first plunger, the exterior front end of said second plunger flaring radially outwardly to define a second conical exterior; a second sealing ring on said second conical exterior in opposing relationship to said front conical seating area of said valve body; a second coil spring positioned in the interior of said second plunger with its rear end bearing against the rear end interior portion of said second plunger ahead of said internal conical surface; and a perforated supporting disc secured within said front end of said valve body and including a rearwardly directed hub supporting the front end of said second spring, said valve body including a plurality of ribs extending rearwardly and spaced circumferentially about the interior of said open front end, each of said ribs including a transverse slot; and a star washer having projections adapted to fit within the transverse slots upon rotation within said open front end to secure said perforated supporting disc in position, whereby pressure exerted on said first and second plungers through said rear opening of said valve body moves said first and second plungers as a unit toward said front end opening with the aid of said first coil spring and against the bias of said second coil spring to provide an annular opening between said front conical seating area and said second conical exterior and whereby pressure exerted on said first and second plungers through said front end opening moves said first plunger only in a rearward direction to provide an annular opening between said first conical exterior at the rear end of said first plunger and said interior conical surface at the rear end of said second plunger.

2. A two-way poppet valve according to claim 1, including a screen disc between said star washer and perforated supporting disc.

3. A two-way poppet valve according to claim 2, in which said reduced diameter portion in said valve body includes longitudinal interior ribs for guiding movement of said second plunger, said rearwardly directed hub of said perforated supporting disc having a cylindrical bore for receiving the exterior front end portion of said first plunger to guide the movement of said first plunger.

References Cited in the file of this patent

UNITED STATES PATENTS

| | | |
|---|---|---|
| 549,413 | White | Nov. 5, 1895 |
| 1,583,834 | Humphrey | May 11, 1926 |
| 2,995,148 | Novak et al. | Aug. 8, 1961 |